United States Patent Office 3,790,588
Patented Feb. 5, 1974

3,790,588
METHOD OF MANUFACTURING DIALKYL-AMINO - 1,3,4 - OXADIAZOLES AND 1,3,4-THIADIAZOLES
Norman A. Dahle, Mission, Kans., assignor to Gulf Research and Development Company, Pittsburgh, Pa.
No Drawing. Filed Oct. 24, 1969, Ser. No. 869,385
Int. Cl. C07d 85/54, 91/62
U.S. Cl. 260—306.8 D                    6 Claims

ABSTRACT OF THE DISCLOSURE 5-substituted tetrazoles are reacted with N,N-dialkyl carbamyl chlorides or corresponding thiocarbamyl chlorides and the reaction products are heated to produce 2-dialkylamino-5-substituted-1,3,4-oxadiazoles and thiadiazoles by decomposition and molecular rearrangement. The products are useful as selective herbicides.

DESCRIPTION OF INVENTION

This invention is a new method for the synthesis of 2 - dialkylamino-5-substituted-1,3,4-oxadiazoles and thiadiazoles of the general structural formulas:

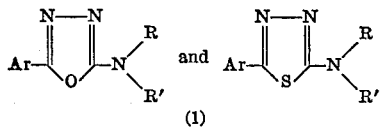

(1)

A procedure for synthesis of 2,5-dialkyl-1,3,4-oxadiazoles developed by R. Huisgen et al. utilizes the reaction of a 5-substituted tetrazole (2) with an acid anhydride or halide (3) to give the 5 - substituted-2-acyl-2H-tetrazole (4) which rearranges on heating to the corresponding 2,5-disubstituted oxadiazole (5) according to the following scheme:

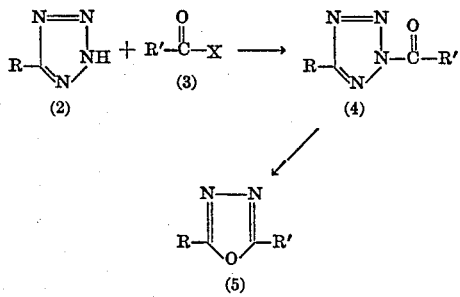

This method has proved to be satisfactory for placing a second hydrocarbon substituent on the oxadiazole ring. It has been the practice to use a less direct method for placing alkylamino substituents on the ring. I have discovered, however, that a dialkylamino substituent can be placed on the ring by a method which is essentially no more difficult or complicated.

According to the method of this invention, for example, a pyridine solution of a 5-substituted tetrazole is first reacted with a dialkyl carbamyl chloride to give the 5-substituted 2H-tetrazole-2-carboxamide, (6):

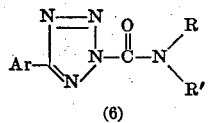

(R=alkyl or aryl; R'=methyl or ethyl.) I have discovered that the carboxamide derivative (6), readily loses nitrogen and rearranges when heated at 90–130° C. to give the members of the oxadiazole series represented by the general structural Formula 1. Alternatively, a thiocarbamyl tetrazole is believed to rearrange to the corresponding thiadiazole. However, it is more convenient to continue heating after mixing the thiocarbamyl chloride with the 5-aryltetrazole, obtaining the thiadiazole directly, without attempting to isolate a thiocarbamyltetrazole intermediate compound.

The structural formulas of the intermediate tetrazoles and oxadiazoles which appear herein are consistent with the disclosures in the literature, particularly by Huisgen and coworkers, in the following references:

(a) R. Huisgen, Agnew. Chem., 70, 359 (1960);
b) R. Huisgen, J. Sauer, H. J. Sturm, and J. H. Markgraf Ber., 93, 2106 (1960);
(c) J. Sauer, R. Huisgen, and H. J. Sturm Tetrahedron 11, 241 (1969);
(d) R. Huisgen, H. J. Sturm, and M. Seidel, Ber. 93, 2885 (1961);
(e) R. Huisgen, H. J. Sturm, and M. Seidel, Ber. 94, 1555 (1961);
(f) R. Huisgen, J. Sauer, and M. Seidel, Ber. 94, 2503 (1961);

The known oxadiazole compounds prepared by the method of this invention have melting points which are substantially identical to the melting points of the same compounds disclosed in the literature and prepared by an unambiguous route. (See CA: 64 P5106f, Fr. M3573.)

The tetrazole starting materials employed in the following illustrative procedures were prepared by the method of W. G. Finnegan, R. A. Henry and R. Lofquist which utilizes the reaction of arylnitriles with a mixture of ammonium chloride and sodium azide in dimethyl formamide containing a catalytic amount of lithium chloride. (W. G. Finnegan, R. A. Henry, and R. Lofquist, J. Am Chem. Soc., 80, 3908 (1958), and U.S. Pat. 2,977,372.)

ILLUSTRATIVE PROCEDURES 5-aryl-2-dialkylcarbamyl-2T-tetrazoles

The following general procedure was utilized in the preparation of these compounds. To a stirred solution of the appropriate tetrazole dissolved in a minimum volume of pyridine was added dropwise the dialkyl carbamyl chloride, keeping the temperature below 30° by cooling the reaction flask in an ice bath. The reaction mixture, after standing overnight, was cooled in an ice bath and diluted with water. The insoluble material was collected by vacuum filtration and allowed to dry in air. A portion of the crude product was purified for use and for combustion analysis by dissolving it in ethyl acetate, at room temperature, filtering the resulting solution and precipitating the product with hexane. The nuclear magnetic resonance spectrum of the product showed a characteristic broad peak for the hydrogens attached to the carbon adjacent to the carboxamide nitrogen. The infrared spectrum of the product exhibited a peak at 5.8 mμ.

2-aryl-5-dialkylamino-1,3,4-oxadiazoles

The following is a description of the general procedure of this invention for the preparation of the aryl dialkylamino oxadiazoles. The crude product resulting from the treatment of a tetrazole with a dialkylcarbamyl chloride was placed in a test tube (30 x 7.5 cm.) equipped with a magnetic stirrer and immersed in an oil bath. The temperature was slowly increased until the solid melted.

If the melting point of the starting material was over 100° C. the bath temperature was held at 80° C. for 1–2 hours prior to increasing the temperature to the melting point. The temperature of the oil bath was slowly raised to 120–30° and maintained until the evolution of nitrogen ceased. The tube and its contents were allowed to cool to room temperature and the resulting product was purified by distillation or recrystallization from a suitable solvent. The infrared spectrum of the product showed the absence of a carbamyl absorption in the 5.8 mm. region and the appearance of a strong band in the 6.2 mm. region. The nuclear magnetic resonance spectrum exhibited a sharp absorption for the hydrogen atoms on the carbon atoms adjacent to the nitrogen.

Preparation of 2-aryl-5-dialkylamino-1,3,4-oxadiazoles hydrochlorides

The oxadiazole was dissolved in a small volume of ether and hydrogen chloride was bubbled through the solution until the precipitation was complete. The insoluble material was separated and used without further purification.

2-aryl-5-dimethylamino-(diethylamino)-1,3,4-thiadiazoles

The preparation of 2-dimethylamino-5-phenyl-1,3,4-thiadiazole will serve as an illustration of the general procedure employed to prepare these compounds.

A stirred mixture of 14.6 g. ((0.1 mole) of 5-phenyltetrazole and 13.5 g. (0.11 mole) of dimethylthiocarbamyl chloride in 150 ml. of 1,2-dimethoxyethane was heated at reflux for 18 hours. The liquid in the mixture was then evaporated to dryness and the resulting residue was allowed to stir with 150 ml. of 5% sodium hydroxide for 4 hours. The insoluble material was separated, washed well with water and recrystallized from ethyl acetate to give 8.3 g. (43%): M.P. 97–99°. The infrared spectrum shows a strong band at 6.5 g., a feature characteristic of this group of compounds.

Structural formulas and properties of compounds prepared by the method of this invention appear in the following tables.

2-ARYL-5-DIALKYLAMINO-1,3,4-OXADIAZOLES

| | | | Analysis | | | | | |
|---|---|---|---|---|---|---|---|---|
| | | | Calculated | | | Found | | |
| Ar | R | M.P. (° C.) or B.P. (° C./mm.) | C | H | N | C | H | N |
| Ph | Me | 84–6 | No analysis | | | | | |
| Ph | Et | 118–20/0.05 | 66.34 | 6.96 | 19.34 | 66.20 | 6.98 | 19.35 |
| o-ClPh | Me | 70–72 | 53.70 | 4.50 | 18.78 | 53.54 | 4.30 | 18.20 |
| o-ClPh | Et | 150–6/0.1 | 57.25 | 5.60 | 16.69 | 57.06 | 5.99 | 17.30 |
| o-ClPh | Hydrochloride | 167–70 | 50.01 | 5.24 | 14.58 | 49.97 | 5.40 | 14.50 |
| m-ClPh | Me | 105–8 | No analysis | | | | | |
| m-ClPh | Et | 148–52/0.1 | 57.25 | 5.60 | 16.69 | 57.16 | 5.67 | 16.60 |
| p-ClPh | Me | 140–41 | 53.70 | 4.50 | 18.78 | 54.03 | 4.83 | 17.55 |
| o-ClPh | Et | 92.3 | 57.25 | 5.60 | 16.69 | 57.49 | 5.30 | 16.60 |
| o-ClPh | Hydrochloride | 125–9 | No analysis | | | | | |
| 2,4-di-ClPh | Et | 146–8/0.05 | 50.36 | 4.57 | 14.68 | 50.29 | 4.89 | 14.78 |
| o-MePh | Et | 124–30/0.1 | 67.50 | 7.40 | 18.16 | 67.78 | 7.65 | 18.85 |
| o-MePh | Hydrochloride | 137–42 | 58.31 | 6.77 | 15.69 | 58.31 | 6.80 | 15.68 |
| o-MePh | Me | 57–8 | 65.00 | 6.44 | 20.67 | 64.93 | 6.47 | 20.75 |
| m-MePh | Me hydrochloride | 215–17 | 55.11 | 5.88 | 17.53 | 55.01 | 6.26 | 17.30 |
| m-MePh | Me | 70–71 | 65.00 | 6.44 | 20.67 | 64.50 | 6.36 | 20.75 |
| m-MePh | Et | 128–32/0.1 | 67.50 | 7.40 | 18.16 | 67.12 | 7.60 | 19.70 |
| m-MePh | Hydrochloride | 173–5 | 58.31 | 6.77 | 15.69 | 58.27 | 6.55 | 15.90 |
| p-MePh | Me | 73.4 | 65.00 | 6.44 | 20.67 | 64.88 | 6.19 | 20.75 |
| o-MePh | Et | 54.6 | 67.50 | 7.40 | 18.16 | 67.51 | 7.46 | 16.08 |
| 2,4-di-MePh | Me | 102–4 | 66.34 | 6.96 | 19.34 | 66.40 | 6.75 | 19.15 |
| 2,4-di-MePh | Et | 158–60/0.5 | 68.54 | 7.80 | 17.12 | 68.78 | 7.79 | 17.00 |
| 2,4-di-MePh | Hydrochloride | 141–3 | 59.67 | 7.15 | 14.91 | 59.60 | 6.94 | 15.00 |
| 3,4-di-MePh | Me | 111–13 | 66.34 | 6.96 | 19.34 | 66.14 | 6.85 | 18.70 |
| 2,4,6-tri-MePh | Et | 105–6 | 69.46 | 8.16 | 16.20 | 69.83 | 8.04 | 16.05 |
| o-MeOPh | Me | 106–7 | 60.26 | 5.97 | 19.16 | 60.39 | 6.02 | 19.29 |
| o-MeOPh | Et | 76–8 | 63.13 | 6.92 | 16.99 | 63.35 | 6.73 | 18.90 |
| 3,4-di-MeOPh | Me | 109–10 | 57.82 | 6.06 | 16.85 | 57.62 | 6.04 | 14.30 |
| 3,5-di-MeOPh | Me | 111–12 | 57.82 | 6.06 | 16.83 | 57.51 | 6.07 | 16.74 |
| p-FPh | Me | 101–3 | 57.96 | 4.86 | 20.27 | 58.26 | 4.72 | 19.95 |
| p-FPh | Et | 128–32/0.2 | 61.26 | 5.99 | 17.86 | 61.10 | 5.89 | 17.60 |
| p-Me₂NPh | Me | 98–9 | 64.58 | 7.74 | 21.52 | 64.89 | 7.72 | 21.70 |
| p-Me₂NPh | Et | 192–4/0.1 | No analysis; NMR consistent | | | | | |
| p-NO₂Ph | Et | 237–9 | 54.95 | 5.38 | 21.36 | 54.94 | 5.68 | 21.44 |
| p-NO₂Ph | Me | 147–9 | 51.28 | 4.30 | 23.92 | 50.95 | 4.14 | 23.91 |
| α-Naphthyl | Me | 112–13 | 70.27 | 5.47 | 17.56 | 70.28 | 5.32 | 17.76 |
| Do | Et | 95–7 | 71.88 | 6.40 | 15.72 | 71.65 | 6.32 | 16.06 |
| 2-pyridyl | Me | 114–15 | 56.83 | 5.29 | 29.45 | 56.94 | 5.20 | 28.90 |
| 6-Me-2-pyridyl | Me | 113–15 | 58.80 | 5.92 | 27.43 | 58.66 | 5.93 | 28.80 |
| 3,5-di-NO₂Ph | Me | 158–9 | 43.01 | 3.24 | 25.08 | 42.12 | 3.10 | 24.93 |
| 3,5-di-NO₂Ph | Et | 110–12 | 46.90 | 4.26 | 22.79 | 39.71 | 3.34 | 19.34 |
| p-Me₂NCONHPh | Et | 169–71 | 59.38 | 6.97 | 23.08 | 58.28 | 6.61 | 23.23 |
| p-NH₂Ph | Et | 107–8 | 62.04 | 6.94 | 24.12 | 59.90 | 6.74 | 24.05 |
| Me—N(C₆H₄)—, H | Me | 247–8 | 36.16 | 3.94 | 16.86 | 36.80 | 4.14 | 17.03 |
| 4-pyridyl | Me | 121–3 | 56.83 | 5.29 | 29.45 | 35.91 | 5.06 | 30.31 |
| 3,4-di-ClPh | Et | 114–15 | 50.36 | 4.57 | 14.68 | 49.75 | 4.43 | 14.72 |
| 3,4-di-ClPh | Me | 130–2 | 46.53 | 3.51 | 16.28 | 46.26 | 3.20 | 16.45 |
| m-NO₂Ph | Et | 89–91 | 54.95 | 5.38 | 21.36 | 54.79 | 5.41 | 22.08 |
| m-NO₂Ph | Me | 136–7 | 51.28 | 4.30 | 23.92 | 50.78 | 4.23 | 24.23 |
| p-EtCONHPh | Et | 193–4 | 59.07 | 7.62 | 21.19 | 62.10 | 6.94 | 20.24 |
| p-EtCONHPh | Me | 220–2 | 59.98 | 6.19 | 21.52 | 59.27 | 6.12 | 22.25 |
| 3-Cl-4-MePh | Me | 104–5 | 55.58 | 5.08 | 17.68 | 55.22 | 5.22 | 18.10 |
| 3-Cl-4-MePh | Et | 73–4 | 58.75 | 6.06 | 15.81 | 59.16 | 5.97 | 15.97 |
| p-OHPh | Et | 195–7 | 61.78 | 6.48 | 18.01 | 61.40 | 6.30 | 18.30 |
| 4-Et₂NCO₂-3,5-di-BrPh | Et | 131–3 | 41.65 | 4.52 | 11.43 | 41.86 | 4.69 | 11.45 |

STRUCTURE AND PHYSICAL PROPERTIES OF 5-ARYL-DIALKYLAMINO-1,3,4-THIADIAZOLES

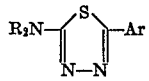

| Ar | R | M.P. (° C.) or B.P. (° C./mm.) | Calculated | | | | | Found | | | | |
|---|---|---|---|---|---|---|---|---|---|---|---|---|
| | | | C | H | Cl | N | S | C | H | Cl | N | S |
| 2-chlorophenyl | Methyl | 75–77 | 50.10 | 4.20 | 14.78 | 17.52 | 13.37 | 50.16 | 4.47 | 15.25 | 17.61 | 13.60 |
| | | | | | | | | 50.04 | 4.12 | 15.05 | 17.45 | 13.75 |
| Do | Ethyl | 148–153/0.5 0.05 | 53.82 | 5.27 | 13.23 | 15.64 | 11.97 | 56.10 | 5.54 | 12.51 | 14.60 | 11.30 |
| Do | Ethyl HCl | 148–50 | | | Not tested | | | | | Not tested | | |
| 3-chlorophenyl | Methyl | 149–50 | 50.10 | 4.20 | 14.78 | 17.52 | 13.37 | 49.94 | 3.93 | 17.60 | 13.70 | 14.90 |
| Do | Methyl HCl | 201–02 dec. | 42.56 | 3.92 | 25.12 | 17.01 | 11.36 | 43.28 | 4.12 | 25.30 | 15.35 | 11.50 |
| 4-chlorophenyl | Methyl | 152–53 | 50.10 | 4.20 | 14.78 | 17.52 | 13.37 | 49.91 | 3.94 | 14.85 | 17.40 | 13.30 |
| Do | Methyl HCl | 214–15 dec. | 43.48 | 4.01 | 25.67 | 15.21 | 11.60 | 43.10 | 3.96 | 25.80 | 14.98 | 11.31 |
| Do | Ethyl | 119–120 | 53.82 | 5.27 | 13.23 | 15.69 | 11.97 | 54.00 | 5.28 | 13.22 | 15.57 | 11.95 |
| Do | Ethyl HCl | 180–82 | 47.35 | 4.97 | 23.29 | 13.11 | 10.54 | 47.24 | 5.23 | 23.90 | 13.60 | 10.52 |
| 2-methylphenyl | Methyl | 56–57 | 60.24 | 5.97 | | 19.62 | 14.68 | 60.27 | 6.24 | | 19.62 | 14.82 |
| Do | Ethyl | 160/0.2–0.25 | 63.12 | 6.92 | | 16.98 | 12.96 | 62.83 | 7.11 | | 16.80 | 13.10 |
| Do | Ethyl HCl | 90–120 dec. | 55.01 | 6.39 | 12.48 | 14.80 | 11.29 | 52.32 | 5.91 | 16.71 | 12.60 | 11.51 |
| 3-methylphenyl | Methyl | 84–85 | 60.24 | 5.97 | | 19.62 | 14.62 | 60.35 | 5.85 | | 19.16 | 14.60 |
| Do | Methyl HCl | 51.65 dec. | 51.65 | 5.51 | 13.86 | 16.42 | 12.57 | 51.87 | 5.85 | 14.08 | 15.92 | 12.55 |
| Do | Ethyl | 156–62/0.2–25 mm. | 63.12 | 6.92 | | 16.98 | 12.96 | 63.31 | 7.01 | | 16.69 | 13.05 |
| Do | Ethyl HCl | 140–43 | 55.01 | 6.39 | 12.48 | 14.81 | 11.29 | 56.78 | 6.21 | 12.20 | 14.40 | 11.00 |
| 4-methylphenyl | Methyl | 140–41 | 60.24 | 5.97 | | 19.62 | 14.62 | 60.25 | 5.89 | | 19.40 | 14.65 |
| Do | Methyl HCl | 213–15 | 51.65 | 5.51 | 13.86 | 16.42 | 12.53 | 51.22 | 5.38 | 14.05 | 16.89 | 12.72 |
| Do | Ethyl | 252–53 | 63.12 | 6.92 | | 16.98 | 12.96 | 63.34 | 7.10 | | 16.70 | 12.81 |
| 2,4-dimethylphenyl | Methyl | 86.87 | 61.77 | 6.47 | | 18.00 | 13.74 | 62.10 | 6.33 | | 18.05 | 13.65 |
| Do | Methyl HCl | 223–24 dec. | 53.42 | 5.97 | 13.14 | 15.57 | 11.88 | 53.47 | 5.81 | 13.05 | 15.89 | 12.05 |
| Do | Ethyl | 150/0.1 mm. | 64.33 | 7.32 | | 16.07 | 12.26 | 64.35 | 7.13 | | 16.40 | 12.08 |
| 3,4-dimethylphenyl | Methyl | 177–79 | 61.77 | 6.47 | | 18.00 | 13.74 | 62.05 | 6.40 | | 17.80 | 13.50 |
| 2,4,6-trimethylphenyl | do | 78–79 | 63.12 | 6.92 | | 16.98 | 12.96 | 63.09 | 6.96 | | 16.61 | 13.08 |
| 4-methoxyphenyl | do | 128–29 | 56.14 | 5.56 | | 17.85 | 13.62 | 56.25 | 5.59 | | 18.10 | 13.60 |
| 3,5-dimethoxyphenyl | do | 117–118 | 54.32 | 5.69 | | 15.83 | 12.08 | 54.22 | 5.69 | | 15.92 | 12.07 |
| Do | Methyl HCl | 212–213 dec. | 47.75 | 5.34 | 11.74 | 13.92 | 10.62 | 48.02 | 5.60 | 12.07 | 13.98 | 11.02 |
| 2-hydroxyphenyl | Methyl | 270–72 | 54.27 | 5.01 | | 18.98 | 14.49 | 45.77 | 5.29 | | 18.10 | 13.48 |
| 4-nitrophenyl | do | 270–72 | 47.99 | 4.02 | | 22.38 | | 47.66 | 4.38 | | 22.18 | |
| 2,6-dichlorobenzyl | do | 141–43 | 45.84 | 3.84 | 24.60 | 14.58 | 11.12 | 45.70 | 4.01 | 24.50 | 14.84 | 11.20 |
| 1-naphthyl | do | 66–67 | 68.05 | 5.71 | | 14.88 | | 68.80 | 6.11 | | 15.28 | |

STRUCTURE AND PHYSICAL PROPERTIES OF 2-DIALKYLAMINO-5-PHENYL-1,3,4-THIADIAZOLES (Ar IS PHENYL)

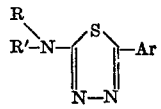

| R / N \ R' | M.P. (° C.) or B.P. (° C./mm.) | Calculated | | | | | Found | | | | |
|---|---|---|---|---|---|---|---|---|---|---|---|
| | | C | H | Cl | N | S | C | H | Cl | N | S |
| Dimethylamino | 97–99 | 58.51 | 5.40 | | 20.47 | 15.62 | 58.36 | 5.01 | | 20.70 | 15.59 |
| Dimethylamino HCl-salt | 198–200 | 49.68 | 5.00 | 14.66 | 17.38 | 13.26 | 49.14 | 5.67 | 13.80 | 16.20 | 12.68 |
| Dimethylamino, salt with CCl₃CO₂H | | No analysis | | | | | No analysis | | | | |
| Dimethylamino picrate | 193–95 | 45.93 | 3.37 | | 20.08 | 7.66 | | | | | |
| Ethyl methylamino | 48–50 | 60.24 | 5.97 | | 19.16 | 14.62 | 59.80 | 5.94 | | 19.60 | |

Use of the oxadiazoles and thiadiazoles as herbicides

So as to illustrate the useful herbicidal properties of the products of this novel method, a group of controlled greenhouse experiments is described below.

(1) Post emergent use: An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots were sprayed with an aqueous dispersion of the active compound prepared as described above, at a rate of 5 lbs. of active compound per acre and at a spray volume of 60 gallons per acre. Approximately one week after the spray application the plants were observed and the results rated according to the following schedule:

| Type of action | Degree |
|---|---|
| C=chlorosis (bleaching) | 0=no effect. |
| N=necrosis | 1=slight effect. |
| G=growth inhibition | 2=moderate effect. |
| F=formative effect (abnormal form of growth) | 3=severe effect. |
| K=non-emergence | 4=maximum effect (all plants died). |

The same rating schedule was employed to judge pre-emergent results obtained according to the procedure below.

(2) Pre-emergent use: A solution of each active compound was prepared by dissolving 290 mg. of the compound to be tested in 200 ml. of acetone. Disposable paper trays about 2 inches deep and half the size of ordinary greenhouse flats were prepared and seeded with a variety of species of plant seeds, then sprayed with the acetone solution at the rate of 10 lbs. of active chemical per acre of sprayed area. One flat, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the flats were examined and herbicidal effect was rated according to the above schedule.

Both post-emergent and pre-emergent results are set forth in the following table.

As can be seen from the tabulated data, the specifically exemplified herbicides have interesting utility. Probably the most interesting use is for control of unwanted vegetation in soybeans, since the ability to do this is not common.

I claim:
1. The method of manufacturing a dialkylamino compound of the structural formula

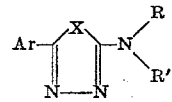

in which X represents a heterocyclic atom selected from the group consisting of oxygen and sulfur, Ar, is an aromatic substituent and R and R' are methyl or ethyl alkyl substituents comprising the steps, (a) reacting a 5-substituted tetrazole of the structural formula

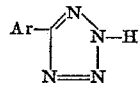

with a compound of the formula

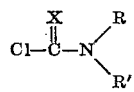

and (b) heating the resulting reaction product at 90 to 130° C. to cause liberation of nitrogen and molecular arrangement.

2. The method of manufacturing 2-diethylamino-5-(2'-methylphenyl)-1,3,4-oxadiazole comprising the steps
(a) reacting 5-(2'-methylphenyl)-tetrazole with N,N-diethylcarbamyl chloride and
(b) heating the resulting reaction product at 90 to 130° C. to cause liberation of nitrogen and molecular rearrangement.

3. The method of manufacturing 2-dimethylamino-5-(2'-methylphenyl)-1,3,4-oxadiazole comprising the steps
(a) reacting 5-(2'-methylphenyl)-tetrazole with N,N-dimethylcarbamyl chloride and
(b) heating the resulting reaction product at 90 to 130° C. to cause liberation of nitrogen and molecular rearrangement.

4. The method of manufacturing 2-dimethylamino-5-(2'-methylphenyl)-1,3,4-thiadiazole comprising the steps
(a) reacting 5-(2'-methylphenyl)-tetrazole with N,N-dimethylthiocarbamyl chloride and
(b) heating the resulting reaction product at 90 to 130° C. to cause liberation of nitrogen and molecular rearrangement.

5. The method of manufacturing 2-diethylamino-5-(2'-methylphenyl)-1,3,4-thiadiazole comprising the steps
(a) reacting 5-(2'-methylphenyl)-tetrazole with N,N-diethylthiocarbamyl chloride and
(b) heating the resulting reaction product at 90 to 130° C. to cause liberation of nitrogen and molecular rearrangement.

6. The method of manufacturing 2-dimethylamino-5-(2',4'-dimethylphenyl)-1,3,4-thiadiazole comprising the steps
(a) reacting 5 - (2',4'-dimethylphenyl)-tetrazole with N,N-dimethylthiocarbamyl chloride and
(b) heating the resulting reaction product at 90 to 130° C. to cause liberation of nitrogen and molecular rearrangement.

References Cited

Herbst, J. Org. Chem., 26, 2372-3 (1961).

RICHARD J. GALLAGHER, Primary Examiner

U.S. Cl. X.R.

71—90, 92; 260—307 G